US011004101B2

(12) United States Patent
Balfour et al.

(10) Patent No.: US 11,004,101 B2
(45) Date of Patent: May 11, 2021

(54) COUPON SYSTEM AND METHODS USING A BLOCKCHAIN

(71) Applicants: Rob Balfour, Toronto (CA); Greg Bandler, Toronto (CA)

(72) Inventors: Rob Balfour, Toronto (CA); Greg Bandler, Toronto (CA)

(73) Assignee: Couponco Ltd, Toronto (CA)

( * ) Notice: Subject to any disclaimer, the term of this patent is extended or adjusted under 35 U.S.C. 154(b) by 0 days.

(21) Appl. No.: 16/830,506

(22) Filed: Mar. 26, 2020

(65) Prior Publication Data

US 2020/0226630 A1 Jul. 16, 2020

Related U.S. Application Data

(63) Continuation of application No. 15/617,352, filed on Jun. 8, 2017, now abandoned.

(60) Provisional application No. 62/350,226, filed on Jun. 15, 2016.

(51) Int. Cl.
*G06Q 30/02* (2012.01)
*G06Q 20/38* (2012.01)
*G06Q 20/40* (2012.01)
*G06Q 20/20* (2012.01)

(52) U.S. Cl.
CPC ....... *G06Q 30/0222* (2013.01); *G06Q 20/204* (2013.01); *G06Q 20/387* (2013.01); *G06Q 20/3829* (2013.01); *G06Q 20/38215* (2013.01); *G06Q 20/405* (2013.01); *G06Q 20/4016* (2013.01); *G06Q 30/0238* (2013.01); *G06Q 2220/00* (2013.01)

(58) Field of Classification Search
None
See application file for complete search history.

(56) References Cited

U.S. PATENT DOCUMENTS

| 6,041,309 | A | 3/2000 | Laor |
| 9,076,158 | B2 | 7/2015 | Novick et al. |
| 2002/0128911 | A1 | 9/2002 | Furuta |
| 2004/0249712 | A1 | 12/2004 | Brown et al. |
| 2008/0065490 | A1 | 3/2008 | Novick et al. |
| 2009/0106115 | A1 | 4/2009 | James et al. |
| 2013/0024267 | A1* | 1/2013 | Libenson ............... G06Q 30/02 705/14.38 |

(Continued)

OTHER PUBLICATIONS

"Distributed Ledger technology for the financial industry" Jeroen van Oerle and Patrick Lemmens ; May 2016.*

*Primary Examiner* — Victoria E Frunzi
(74) *Attorney, Agent, or Firm* — PatentFile, LLC; Bradley C. Fach; Steven R. Kick

(57) ABSTRACT

A computer implemented electronic computer system using a blockchain method for creating, distributing, validating, and redeeming a secure electronic smartcoupon. A smartcoupon transaction record is highly secure and may comprise embedded business rules that define the requirements that consumers and retailers must meet for the smartcoupon to redeemed. Consumers may save or hold smartcoupons in a variety of different digital wallets. Retailers may redeem through their POS system by evaluating the embedded business rules in the smartcoupon against the consumer's purchase basket and if valid, completing the redemption process by publishing a redemption token to smartcoupon transaction record on the Blockchain database.

4 Claims, 12 Drawing Sheets

(56) References Cited

U.S. PATENT DOCUMENTS

| | | | |
|---|---|---|---|
| 2013/0282492 A1* | 10/2013 | Besecker | G06Q 20/208 |
| | | | 705/14.65 |
| 2014/0207552 A1 | 7/2014 | Blosser | |
| 2014/0244383 A1 | 8/2014 | Barnett et al. | |
| 2014/0278858 A1 | 9/2014 | Sullivan et al. | |
| 2016/0140595 A1 | 5/2016 | Werner et al. | |
| 2016/0379241 A1* | 12/2016 | Badger | G06Q 30/0226 |
| | | | 705/14.27 |
| 2019/0073666 A1* | 3/2019 | Ortiz | G06Q 30/0207 |

* cited by examiner

| Name | Value |
|---|---|
| Issuer_ID | 0012345 |
| Campaign_ID | 0005 |
| Offer Name | Launch Campaign |
| Max Units Issued | 1,000 |
| Unit Value | $10.00 |
| Currency | USD |
| Issue Date | June 1, 2016 |
| Expiry Date | June 30, 2016 |
| Restrictions | |
| Rule Type | Buy Any of |
| Product (UPC) | 12345 67890<br>23456 78901<br>34567 89012<br>45678 90123<br>56789 01234<br>67890 12345 |
| Min units | 1 |
| Min Value | --- |
| Max per user | 1 |
| Geography | US Only |
| Retailers | All |
| Other Restrictions | Lorem Ipsum |

*FIG. 6*

| Name | Value |
|---|---|
| SmartCoupon_ID | 8110 012345... |
| Retailer_UID | 1234567 |
| Transaction_ID | abcd123 |
| Product UPC | 12345 67890 |
| Offer Unit Value | $10.00 |
| Currency | CDN |
| Remption Time/ Date | UTC |

*FIG. 7*

COUPON SYSTEM AND METHODS USING A BLOCKCHAIN

CROSS REFERENCE TO RELATED APPLICATIONS

This application claims priority to and the benefit of the filing date of U.S. patent application Ser. No. 15/617,352, filed on Jun. 8, 2017, entitled "COMPUTER-IMPLEMENTED ELECTRONIC COUPON SYSTEM AND METHODS USING A BLOCKCHAIN", which is hereby incorporated by reference in its entirety. U.S. Ser. No. 15/617,352 claims priority to and the benefit of the filing date of U.S. Provisional Application No. 62/350,226, filed on Jun. 15, 2016, entitled "Electronic Coupon System and Methods using a Blockchain", which is hereby incorporated by reference in its entirety.

FIELD OF THE INVENTION

This patent specification relates to the field of a coupon processing system and method. More particularly, the present patent specification relates to an electronic coupon processing system and methods for generating and processing of electronic coupons.

BACKGROUND

Manufacturers of consumer products have long offered coupons to consumers in both printed and electronic formats. These coupons are promotional tools designed to motivate one or more desired consumer behaviors such as new product trial or switching from another competing product. A coupon gives the holder the right to receive a discount under the certain conditions (business rules) as they are defined in the coupon. Historically these rules are printed on the coupon and/or embedded in the barcode included as part of the coupon.

Only a very small percentage (<10%) of coupons are currently issued and redeemed in a digital format. A major barrier to adoption of digital coupons has been the risk of fraud and uncontrolled duplication. It has been too easy to create duplicate copies of a coupon digitally and as a result, Issuers (manufacturers) have been reluctant to issue digital coupons (particularly coupons of a value greater than a small percentage of total retail purchase price). Retailers have also been reluctant to accept these digital coupons as Issuers may not be willing to reimburse retailers if they have accepted a fraudulent coupon. The result is that the migration of couponing as a promotional method has not kept pace with consumers' migration to digital media in general as a means of discovering products and making purchasing decisions.

Therefore a need exists for novel electronic coupon processing systems and methods. There is also a need for novel electronic coupon processing systems and methods which facilitate the ability of consumers and merchants to use electronic coupons. A further need exists for novel electronic coupon processing systems and methods which are able to prevent uncontrolled duplication of electronic coupons. Finally, a need exists for novel electronic coupon processing systems and methods which are able to prevent retailers from accepting fraudulent electronic coupons.

BRIEF SUMMARY OF THE INVENTION

According to one embodiment consistent with the principles of the invention, a computer implemented electronic coupon system using a blockchain is provided. The system may include: a client device having a display screen and an input interface for receiving input from a user; a retailer POS terminal having a display screen and an input interface for receiving input; a computing platform having a processor, a memory in communication with the processor; issuing logic stored in the memory, executable by the processor; and blockchain logic stored in the memory, executable by the processor. The issuing logic may be configured to create a smart coupon transaction record having data which includes a smartcoupon token, and the issuing logic may be configured to provide the smart coupon transaction record to a blockchain database. The blockchain logic may be configured to determine if the smart coupon transaction record is valid, and the blockchain logic may be configured to publish the smart coupon transaction record to the blockchain database, the smartcoupon transaction record including an issuer public key for the issuer that published the smartcoupon transaction record.

In further embodiments, the system may include redemption logic stored in the memory, executable by the processor. The redemption logic may be configured to receive transaction data describing the details of a retail transaction and to provide smartcoupon identification data to the blockchain logic. The blockchain logic may be configured to retrieve a smartcoupon token of the smart coupon transaction record that matches the received smartcoupon identification data from the blockchain database. The redemption logic may also be configured to compare business rules of smartcoupon token to transaction information to determine if smartcoupon is valid and configured to apply the unit value of valid smart coupon to the retail transaction.

In further embodiments, the transaction data describing a product may include a universal product code (upc) and the product identification code of the transaction data describing a product is required to match the product identification code from the retrieved smartcoupon token in order for the smartcoupon to be determined valid.

In still further embodiments, the redemption logic may be configured to create a redemption token which includes the smartcoupon identification data of smartcoupon applied to the retail transaction. The redemption logic may also be configured to store the redemption token in smartcoupon transaction record and configured to provide this smartcoupon transaction record to a blockchain database. The blockchain logic may be configured to determine if the smart coupon transaction record is valid and to publish the smart coupon transaction record to the blockchain database.

According to one embodiment consistent with the principles of the invention, a computer implemented method for providing an electronic coupon system using a blockchain is provided. The method may include the steps of: creating a smart coupon transaction record having data which includes a smartcoupon token; providing the smart coupon transaction record to a blockchain database; determining if the smart coupon transaction record is valid; and publishing the smart coupon transaction record to the blockchain database.

In further embodiments, the method may include the steps of: receiving transaction data describing a product of a retail transaction; receiving smartcoupon identification data; retrieving a smartcoupon token of the smart coupon transaction record that matches the received smartcoupon identification data from the blockchain database; comparing business rules of smartcoupon token to transaction information to determine if smartcoupon is valid; and applying the unit value of valid smart coupon to the retail transaction.

In still further embodiments, the method may include the steps of: receiving smartcoupon identification data of smartcoupon applied to the retail transaction; creating a redemption token; storing the redemption token in smart coupon transaction record; providing the smart coupon transaction record to a blockchain database; determining if the smart coupon transaction record is valid; and publishing the smart coupon transaction record to the blockchain database.

BRIEF DESCRIPTION OF THE DRAWINGS

Some embodiments of the present invention are illustrated as an example and are not limited by the figures of the accompanying drawings, in which like references may indicate similar elements and in which:

FIG. 6 shows a block diagram illustrating an example of a smartcoupon token according to various embodiments described herein.

FIG. 7 depicts a block diagram illustrating an example of a redemption token according to various embodiments described herein.

DETAILED DESCRIPTION OF THE INVENTION

Figure 1:
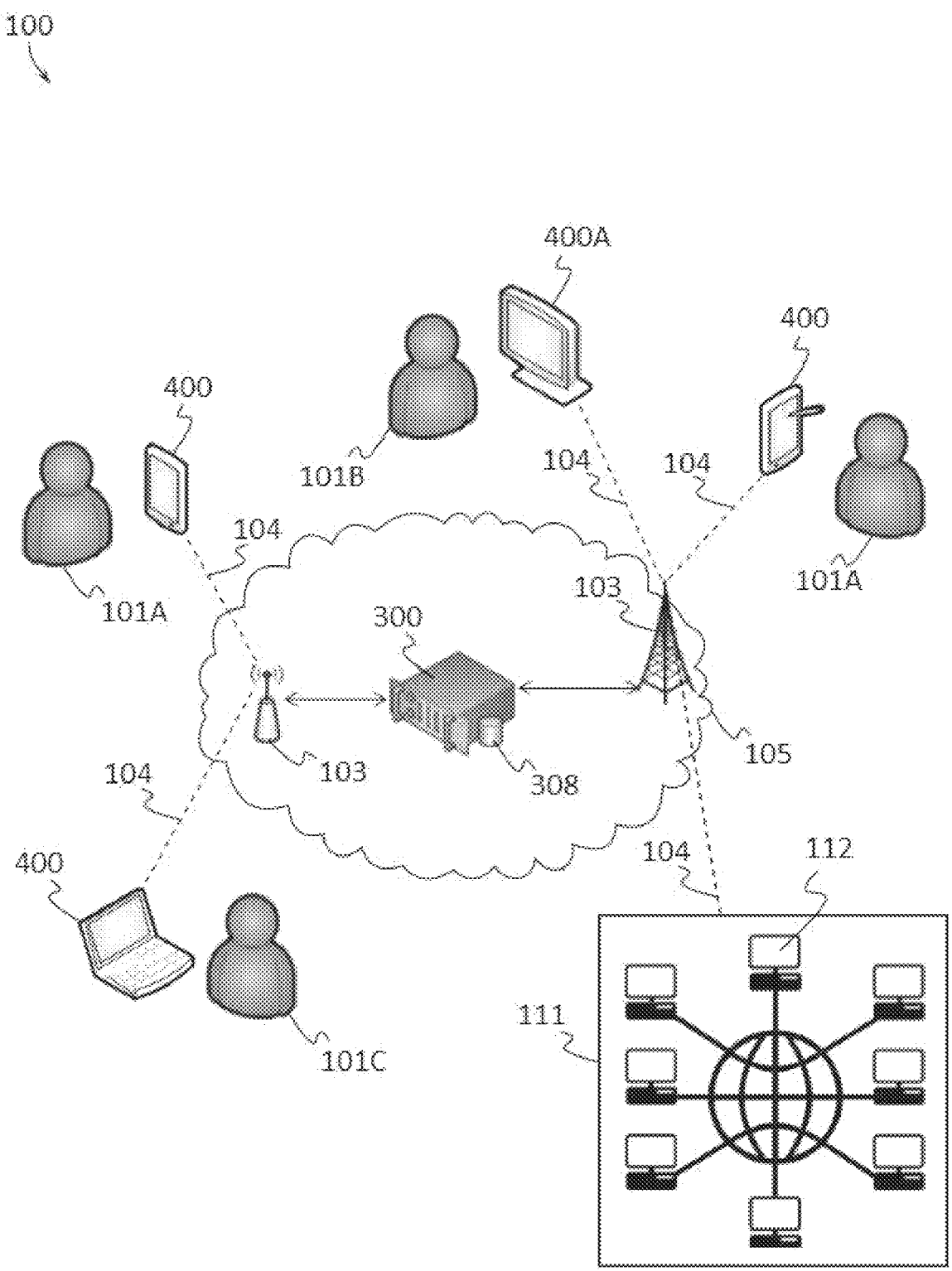
FIG. 1 depicts an illustrative example of some of the components and computer implemented methods which may be found in an electronic coupon system using a blockchain according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

DEFINITIONS

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media.

Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

As used herein, the term "blockchain" shall generally mean a distributed database that maintains a continuously growing ledger or list of records, called blocks, secured from tampering and revision. Every time a smartcoupon transaction record 120 may be published to the blockchain database 109 the smart coupon transaction record 120 may be published as a new block. Each block includes a timestamp and a link to a previous block. Through the use of a peer-to-peer network and a distributed timestamping server, a blockchain database is managed autonomously. Blockchains are an open, distributed ledger that can record transactions between two parties efficiently and in a verifiable and permanent way. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction input results in a different hash value being computed, which indicates potentially compromised transaction input. Digital signatures ensure that transactions originated from senders (signed with private keys) and not imposters. At its core, a blockchain system records the chronological order of transactions with all nodes agreeing to the validity of transactions using the chosen consensus model. The result is transactions that are irreversible and agreed to by all members in the network.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for electronic coupon generation and processing are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIGS. 1-3, examples of some of the physical components which may comprise an electronic coupon system using a blockchain ("the system") 100 according to some embodiments is presented. The system 100 is configured to facilitate the transfer of data and information between one or more access points 103, client devices 400, and servers 300 over a data network 105. Each client device 400 and server 300 may send data to and receive data from the data network 105 through a network connection 104 with an access point 103. A data store 308 accessible by the server 300 may contain one or more databases. The data may comprise any information pertinent to the generation and processing of electronic coupons including information on or describing one or more users 101, information on or describing one or more electronic coupons, or any other information which may be used to enable a user 101 to receive a product, such as goods and services, at a free or reduced price.

The electronic coupons of the system 100 may be referred to as smartcoupons 102. A smartcoupon 102 may be represented in a digital format by data contained within a smart coupon transaction record 120 and optionally represented in a physical format such as by having some of the smart coupon transaction record 120 data printed as a physical hard copy or displayed on a display screen 404A of a client device 400.

In this example, the system 100 comprises at least one client device 400 (but preferably more than two client devices 400) configured to be operated by one or more users 101. Client devices 400 can be any type of mobile computing device, such as laptops, portable retailer Point of Sale terminals 400A, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, non-movable retailer Point of Sale terminals 400A, and the like, that are equipped with a wireless or wired network interface capable of sending data to one or more servers 300 with access to one or more data stores 308 over a wireless or wired local area network 105. Generally, a retailer Point of Sale (POS) terminal 400A, may comprise a client device 400, such as a cash register, check-out shopping cart on an ecommerce site, or a smartphone having a credit card reader, used to process payment for transactions at retail locations. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In some embodiments, the system 100 may be configured to facilitate the communication of information to and from one or more users 101, through their respective client devices 400 and servers 300. Users 101 of the system 100 may include one or more consumers 101A, retailers 101B, and issuers 101C. A consumer 101A may be any individual or entity that desires to enter into a transaction in order to receive a product. A retailer 101B may be any individual or entity that desires to enter into a transaction in order to receive compensation for providing a product to a consumer 101A. An issuer 101C may be any individual or entity that desires to reduce the amount of compensation that a consumer 101A needs to provide to a retailer 101B in order to receive a product through a transaction. Preferably, data describing a smartcoupon 120 maybe be received by the retailer 101B and the system 100 may validate the smartcoupon 120 and allow the smartcoupon 120 to be redeemed for compensation to be provided to the retailer 101B.

In some embodiments, the system 100 may include a blockchain network 111, having one or more nodes 112, which may be in communication with one or more servers 300 and/or client devices 400 of the system 100. A node 112 may be a server 300, a client device 400, or any other suitable networked computing platform. The blockchain network 111 may manage a distributed blockchain database 109 containing data describing smartcoupons 120 of the system 100. The data describing smartcoupons 120 may be maintained as a continuously growing ledger or list of smart coupon transaction records 120, which may be referred to as blocks, secured from tampering and revision. Each block includes a timestamp and a link to a previous block. Through the use of a peer-to-peer blockchain network 111 and a distributed timestamping server 300, a blockchain database 109 may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input. Digital signatures ensure that data entry transactions (data added to the blockchain database 109) originated from senders (signed with private keys) and not imposters. At its core, a blockchain database 109 may record the chronological order of data entry transactions with all nodes 112 agreeing to the validity of entry transactions using the chosen consensus model. The result is data entry transactions that are irreversible and agreed to by all members in the blockchain network 111.

Figure 2:
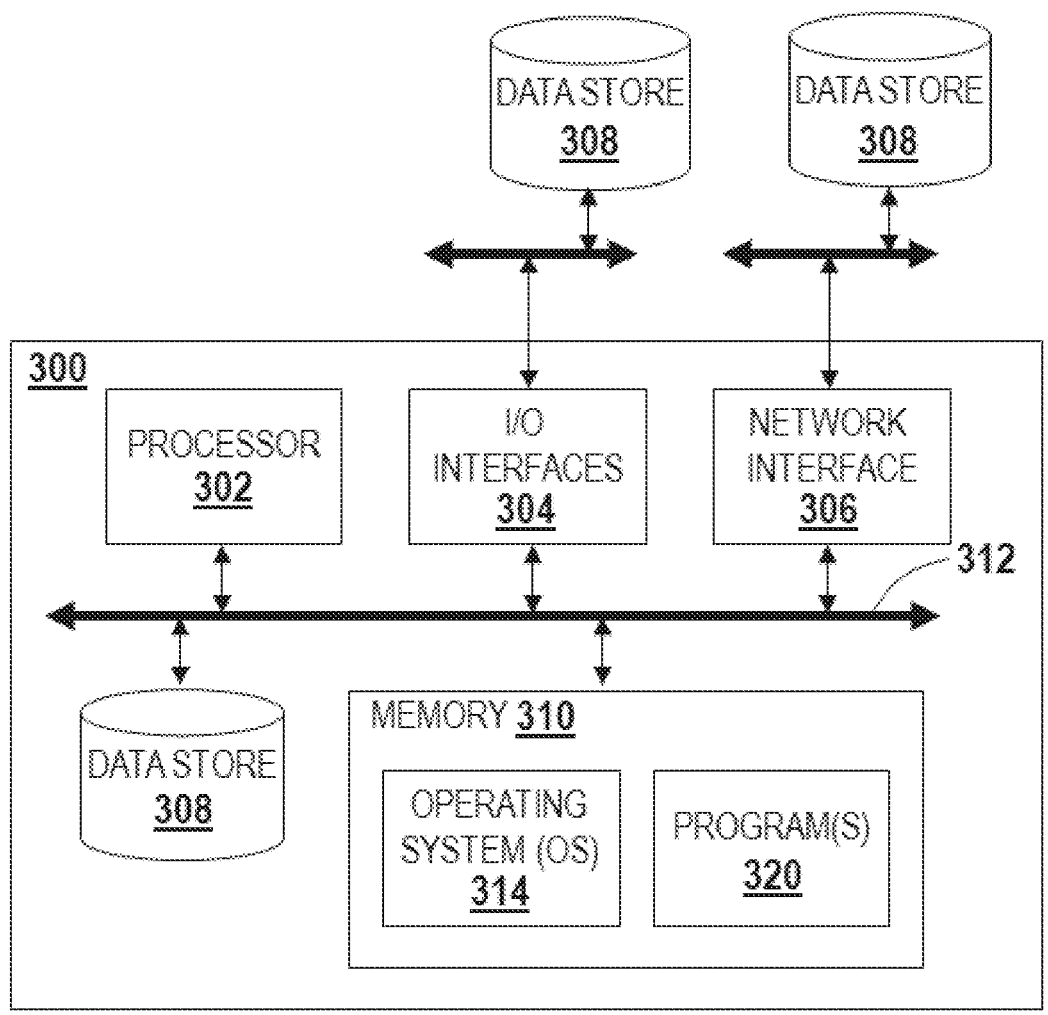
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (0/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 320 may include an issuing engine 191 and a blockchain engine 192 and the programs 320 may be configured to implement the various processes, algorithms, methods, techniques, etc. described herein.

Figure 3:
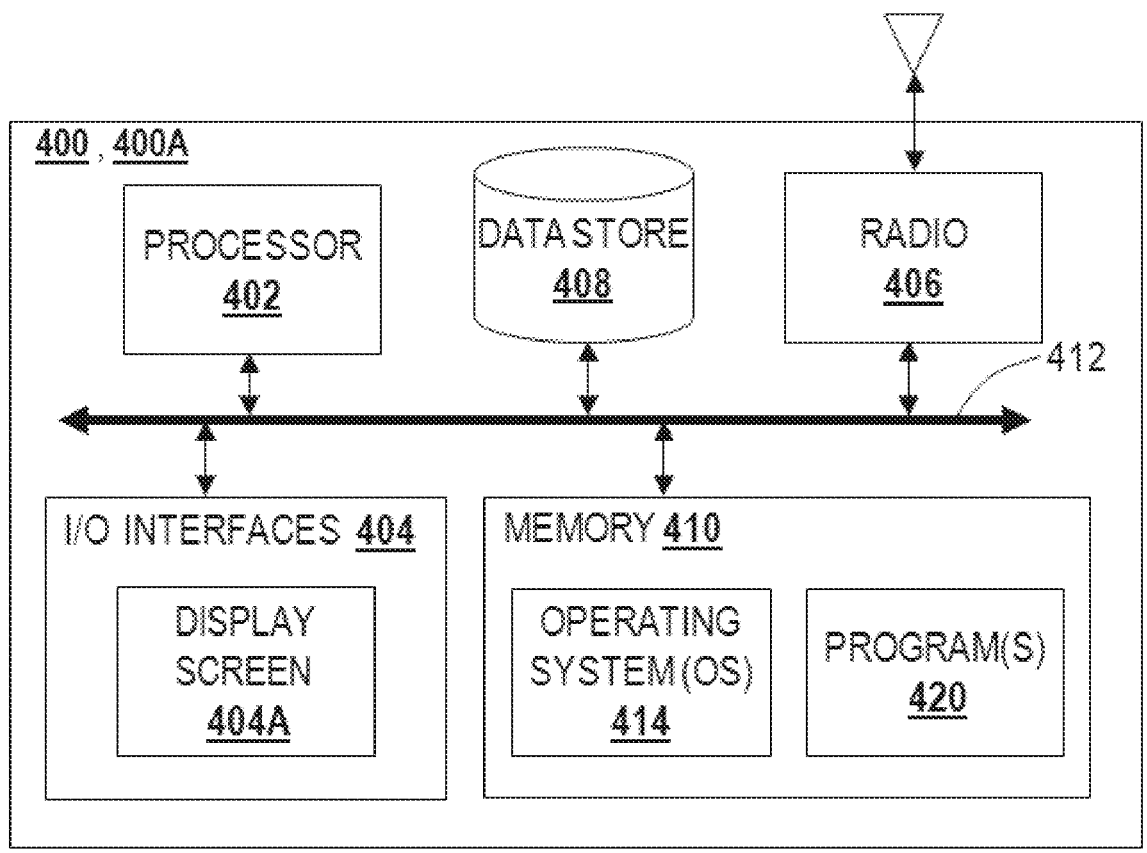
FIG. 3 shows a block diagram illustrating an example of a client device which may be used by the system as described in various embodiments herein.
Figure 4:
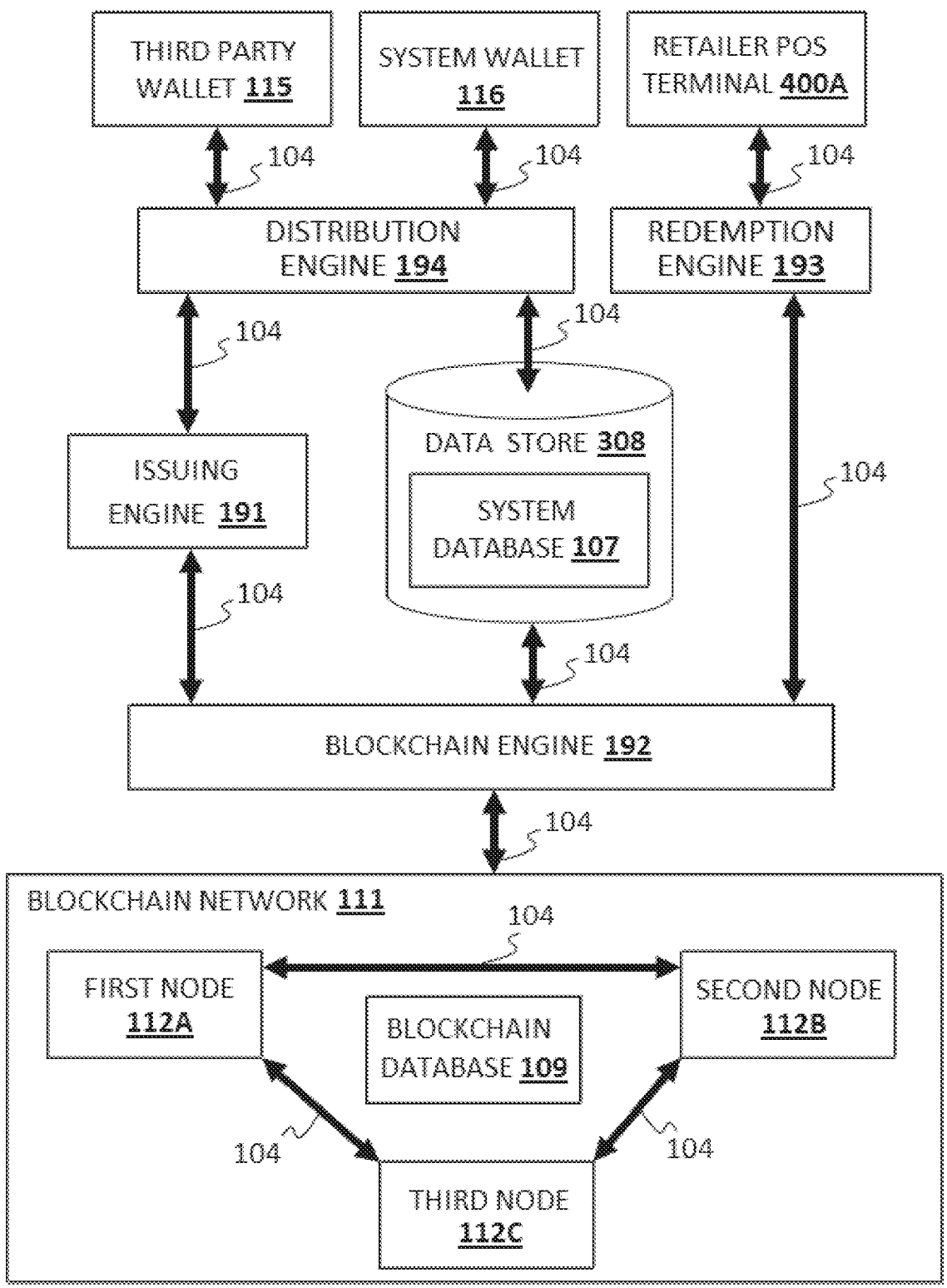
FIG. 4 depicts a block diagram illustrating some software rules engines and components of an electronic coupon system according to various embodiments described herein.
Figure 5:
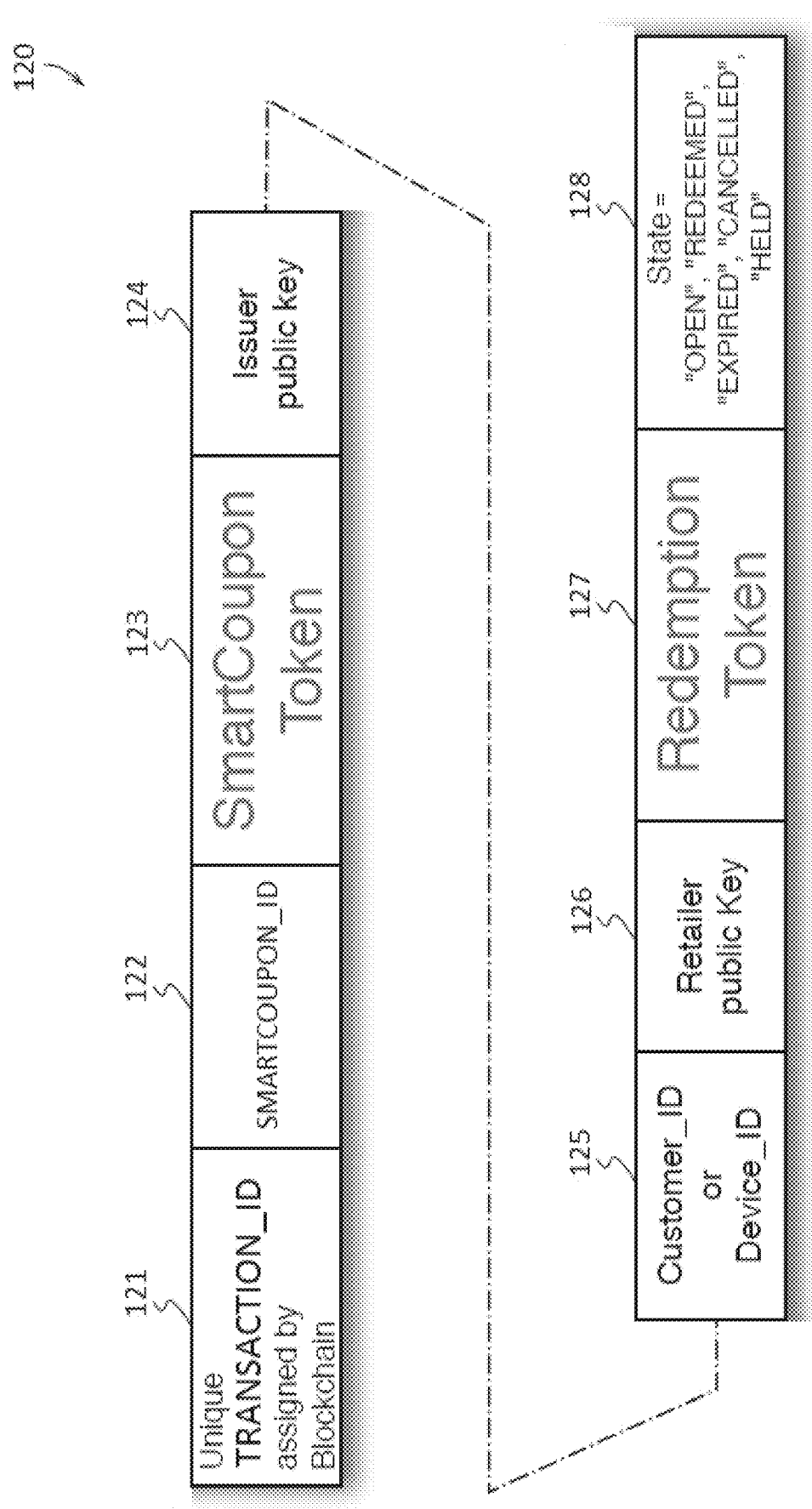
FIG. 5 illustrates a block diagram illustrating an example of a smart coupon transaction record according to various embodiments described herein.

Referring to FIG. 3, in an exemplary embodiment, a block diagram illustrates a client device 400, such as a retailer POS terminal 400A, of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User 101 input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, I/O interfaces 404 of a retailer POS terminal 400A type of client device 400 may include a scanner or barcode reader, typically having a light source, a lens and a light sensor for translating optical impulses into electrical ones, and/or a keypad or other manual data entry device.

The optional radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include a redemption engine 193 and various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Referring now to FIGS. 1-7, they system 100 may comprise software rules engines which may optionally be configured to run on a server 300 (FIGS. 1 and 2) and/or a client device 400 (FIGS. 1 and 3) in addition to the physical components. A server 300 and/or a client device 400 may be in wired and/or wireless electronic communication through a network 105 with a data store 308 comprising a database, such as a system database 107. The engines 191, 192, 193, 194, may read, write, or otherwise access data of the system 100 and which may be stored in a system database 107. Additionally, the engines 191, 192, 193, 194, may be in electronic communication so that data may be readily exchanged between the engines 191, 192, 193, 194.

In this and some embodiments, one or more servers 300 may be configured to run one or more software rules engines or programs such as an issuing engine 191 and a blockchain engine 192 while a client device 400, such as a retailer POS terminal 400A, may be configured to run one or more software rules engines or programs such as a redemption engine 193. In other embodiments, an issuing engine 191, blockchain engine 192, and/or redemption engine 193 may be configured to run on one or more client devices 400 and/or servers 300 with data transferred to and from one or more servers 300 in communication with a data store 308 through a network 105. In still further embodiments, a server 300 or a client device 400 may be configured to run an issuing engine 191, blockchain engine 192, and/or redemption engine 193. It should be understood that the functions attributed to the engines 191, 192, 193, described herein are exemplary in nature, and that in alternative embodiments, any function attributed to any engine 191, 192, 193, may be performed by one or more other engines 191, 192, 193, or any other suitable processor logic.

In some embodiments, the issuing engine 191 may comprise or function as issuing logic stored in memory 310, 410 which may be executable by the processor 302, 402, of a server 300 and/or client device 400. The issuing engine 191 may allow an issuer 101C and other interested users 101 to read, write, edit, create, import, export, and delete information in a smartcoupon transaction record 120 before the smartcoupon transaction record 120 is added to the blockchain database 109. The issuing engine 191 may also provide smart coupon transaction records 120 to a blockchain database 109 preferably by providing the smart coupon transaction records 120 to a blockchain engine 192.

A distribution engine 194 may be used distribute smartcoupons 102, or data from a smart coupon transaction record 120 describing a smartcoupon 102 to various online sites, and may allow consumers 101A to add the smartcoupon 102 to a digital wallets, including third party wallets 115, such as those provided by Apple and Google, and a system wallet 116 which can be administered by the system 100 and (optionally) used by consumers 101A to store multiple smartcoupon 102 in a digital format. Additionally, the distribution engine 194 may optionally create, edit, and otherwise manipulate data records or accounts for each customer 101A in the system database 107 in which each account may include a Customer_ID (customer identification string) and any SmartCoupon_IDs (smartcoupon identification strings) that the customer 101A may have selected or otherwise indicated a desire to use in a transaction. Consumers 101A may to present their Customer_ID to retailers 101B and the issuing engine 191 may provide information describing the smartcoupons 102 associated with the Customer_ID relevant to products in a transaction so that more than one smartcoupon 102 may be redeemed during the transaction in a batch process.

In some embodiments, a blockchain engine 192 may comprise or function as blockchain logic stored in memory 310, 410 which may be executable by the processor 302, 402, of a server 300 and/or client device 400. The blockchain engine 192 may enable communication between the blockchain database 109 and other components of the system 100. The blockchain engine 192 may also retrieve one or more smartcoupon transaction records 120, and data contained therein, from the blockchain database 109, which may optionally be associated with a Customer_ID in a system database 107. The blockchain engine 192 may also determine if a smart coupon transaction record 120 is valid and also publish the smart coupon transaction record 120 to the blockchain database 109.

In some embodiments, the redemption engine 193 may comprise or function as redemption logic stored in memory 310, 410 which may be executable by the processor 302, 402, of a server 300 and/or client device 400 such as a retailer POS terminal 400A. A redemption engine 193 may be configured to receive transaction data describing the details of a retail transaction, such as time and date, products and their respective upc, retailer name, location, etc., from an input interface 404 of a retailer POS terminal 400A. The redemption logic 193 may also be configured to provide smartcoupon identification data to the blockchain engine 192. The redemption logic 193 may also be configured to compare business rules contained in a smartcoupon token to transaction information and to determine if a smartcoupon is valid. The redemption logic 193 may also be configured to apply the unit value of valid smart coupon to a retail transaction.

In some embodiments, the system 100 may comprise one or more databases, such as a system database 107, optionally stored on a data store 308, 408, of one or more servers 300 and/or client device 400 accessible to an issuing engine 191, blockchain engine 192, and/or redemption engine 193. A system database 107 may comprise any data and information input to and output by the system 100. This data may include one or more other databases describing consumers 101A associated with the system 100 which may include a data record for each customer 101A optionally having a Customer_ID associated with contact information of the customer 101A, one or more smartcoupons 102 selected by a customer 101A, one or more smartcoupons 102 used by the customer 101A, or any other data. Data of the system database 107 may also include one or more other databases describing retailers 101B associated with the system 100 which may include a data record for each retailer 101B optionally having a Retailer_ID associated with contact information of the retailer 101B, one or more smartcoupons 102 redeemed by the retailer 101B, other transaction information, financial data, or any other data. Data of the system database 107 may also include one or more other databases describing issuers 101C associated with the system 100 which may include a data record for each issuer 101C optionally having an Issuer_ID associated with contact information of the issuer 101C, one or more smartcoupons 102 issued by the issuer 101C and selected by a customer 101A, such as in a digital wallet 115, 116, one or more smartcoupons 102 issued by the issuer 101C and redeemed by a retailer 101B, one or more smartcoupons 102 issued by the issuer 101C and not redeemed by a retailer 101B other transaction information, financial data, or any other data.

The system 100 may also comprise one or more blockchain databases 109 which may be operated via a blockchain network 111 having one or more nodes 112, such as a first node 112A, a second node 112B, and a third node 112C. A blockchain database 109 may store smartcoupons 102 of the system 100 in digital format as a smart coupon transaction record 120 comprising one or more data fields. Data fields of a smart coupon transaction record 120 may include: transaction_ID 121; smartcoupon_ID 122; smartcoupon token 123; issuer public key 124; customer_ID 125; retailer public key 126; redemption token 127; and state 128.

The transaction_ID 121 data field may contain information or data which may comprise a unique identifier, such as an alphanumeric string, digital string, or any other suitable electronic format, created by the blockchain network 111 or blockchain engine 192.

The SmartCoupon_ID 122 data field may describe the smartcoupon identification data for a smartcoupon and may contain information or data which may comprise a unique identifier preferably created by the distribution engine 194 that can be displayed as a barcode or other electronic format such as NFC and read an input interface 404 of a retailer POS terminal 400A or an alphanumberic string readable by a human retailer 101B and entered into an input interface 404 of a retailer POS terminal 400A.

The smartcoupon token 123 data field may contain information or data which may comprise all of the business rules of the smartcoupon 102 stipulated by the issuer 101C that must be satisfied in order for the smartcoupon 102 to be validated and redeemed.

The issuer public key 124 data field may contain information or data which may comprise a public key identifier, such as an alphanumeric string, digital string, or any other suitable electronic format, for the issuer 101C.

The customer_ID 125 data field may be optional to the smart coupon transaction record 120 and may contain information or data which may comprise one or more unique identifiers, such as an analytics identifier, CoupDog identifier or the like, issuer and/or retailer identifiers and the like, which may be an alphanumeric string, digital string, or any other suitable electronic format, which provides an identifier for the consumer 101A who holds or redeems the smartcoupon 120. Optionally, the customer_ID 125 data field may comprise a unique device identifier of the electronic device 400 of the customer 101A who redeemed the smartcoupon 120.

The retailer public key 126 data field may contain information or data which may comprise a public key identifier for the retailer 101B where the smartcoupon 120 was validated and redeemed.

The redemption token 127 data field may contain information or data which may comprise details on the retailer 101B where the SmartCoupon 102 was redeemed and details on the transaction and purchase of products.

The state 128 data field may comprise data and information which describes the state of the smartcoupon 102 which may include: open, held, redeemed, expired, and cancelled. An open state may indicate that the SmartCoupon 102 is available to be held or redeemed. For example, only SmartCoupons 102 with an open or held state may be redeemed or validated. A held state means that a consumer 101A has added the offer to a wallet, but not yet redeemed that offer. A redeemed state may indicate that a SmartCoupon 102 has satisfied the Business Rules in the smartcoupon token 123 and the Retailer 101B has added a redemption token 127 to the blockchain smart coupon transaction record 120. An expired state may indicate that the current date is later than the expiry date 137 in the smartcoupon token 123 and it can no longer be redeemed. A canceled state may indicate that the issuer 101C has issued a cancellation request for the smartcoupon 102 and that cancellation request has been accepted by the blockchain network 111.

FIG. 6 shows some data fields of a smartcoupon token 123 and some exemplary data the fields may contain. In some embodiments, a smartcoupon token 123 may include one or more data fields such as: issuer_ID 130; campaign_ID 131; offer name 132; max units issued 133; unit value 134; currency 135; issue date 136; expiry date 137; restrictions 138; rule type 139; product 140; min units purchased 141, min value purchased 142, max per user 143; geography restrictions 144; retailers restrictions 145; and other restrictions 146. The data in the fields of the smartcoupon token 123 may be or form the business rules of the smartcoupon 102 which must be satisfied in order for the smart coupon 102 to be redeemed and validated.

The issuer_ID 130 data field may contain data which may comprise a unique identifier, such as an alphanumeric string, digital string, or any other suitable electronic format, which provides an identifier for the issuer 101C who created the smartcoupon 120.

The campaign_ID 131 data field may contain data which may comprise a unique identifier, such as an alphanumeric string, digital string, or any other suitable electronic format, which provides an identifier for an advertising campaign of the issuer 101C.

The offer name 132 data field may contain data which may comprise a unique identifier, such as an alphanumeric string, digital string, or any other suitable electronic format, which provides a name for an advertising campaign of the issuer 101C.

The max units issued 133 data field may contain data which may indicate the number of smartcoupons 102 which can be issued to the blockchain and ultimately redeemed.

The unit value 134 data field may contain data which may indicate the value of the smartcoupon 102 and which may be deducted from the price that the consumer 101A must pay to the retailer 101B to be provided to the retailer 101B by the issuer 101C.

The currency 135 data field may contain data which may indicate which currency the unit value 134 is in.

The issue date 136 data field may contain data which may indicate the creation date of the smartcoupon 102.

The expiry date 137 data field may contain data which may indicate the expiration date of the smartcoupon 102.

The rule type 139 may contain data that defines the type of business rule that may apply. This may include, but is not limited to buying any one of the products defined, buying an minimum number of units of products defined or buying a minimum value of products defined.

The product 140 data field may contain data which may comprise a unique identifier, such as an alphanumeric string, digital string, or any other suitable electronic format, which provides a Universal Product Code (UPC) or other identifier for the product to which the smartcoupon 102 may be applied.

The minimum units 141 represent the fewest number of units of products defined in 140 that must be purchased to qualify for the discount unit value 134.

The minimum value 142 represent the minimum value in the defined currency 135 that must be spent on the qualifying products 140 to qualify for the discount 134.

The max per user 143 data field may contain data which may indicate the maximum number of the smartcoupons 102 that may be used by a consumer 101A.

The geography restrictions 144 data field may contain data which may indicate any geographic restrictions to where the smartcoupon 102 may be validated or redeemed.

The retailer restrictions 145 data field may contain data which may indicate which retailers 101B may or may not validate or redeem the smartcoupon 102.

The other restrictions 146 data field may contain data which may indicate or describe any other restrictions which an issuer 101C may require to be met in order for the smartcoupon to be determined to be valid.

FIG. 7 shows some data fields of a redemption token 127 and some exemplary data the fields may contain. In some embodiments, a redemption token 127 may include one or more data fields such as: smartcoupon_ID 122; retailer UID 150; transaction_ID 121; product UPC 151; offer unit value 152; currency 135; and redemption time and date 153. The data in the fields of the redemption token 127 describe the transaction in which the smart coupon 102 was redeemed and validated.

The retailer UID 150 data field contain data which may comprise a unique identifier, such as an alphanumeric string, digital string, or any other suitable electronic format, of the retailer 101B which validated or redeemed the smartcoupon 102.

The transaction ID 121 may contain one or more data elements including store number, aisle number receipt number or other alphanumeric strings related to the transaction event.

The product UPC 151 data field may contain data which may comprise a unique identifier, such as an alphanumeric string, digital string, or any other suitable electronic format, which provides a Universal Product Code (UPC) or other identifier for the product(s) to which the smartcoupon 102 was applied.

The offer unit value 152 data field may contain data which may indicate the value of the smartcoupon 102 and which may be deducted from the price that the consumer 101A must pay to the retailer 101B to be provided to the retailer 101B by the issuer 101C.

The redemption time and date 153 data field may contain data which may indicate the time and date that the smartcoupon 102 was redeemed or validated.

Figure 8:
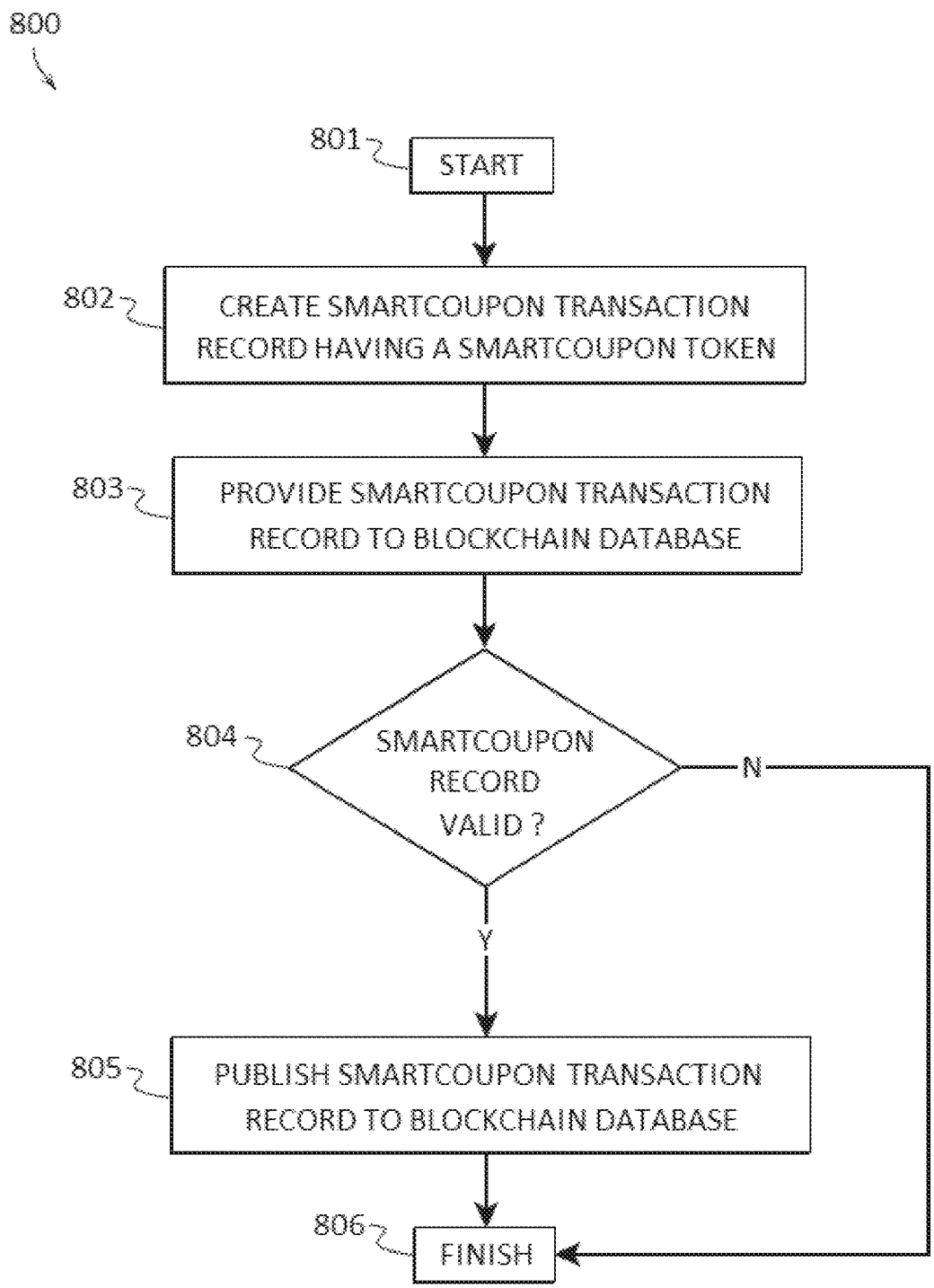
FIG. 8 illustrates a block diagram of an example of a method for adding a block of smartcoupons to a blockchain database according to various embodiments described herein.

A block diagram of an example of a method for adding a block of smartcoupons to a blockchain database ("the method") 800 according to various embodiments described herein is shown as an overview in FIG. 8. The method 800 may be used to create a smartcoupon 102 and add it to the blockchain database 109 in digital format. In some embodiments, the method 800 may start 801 and a smart coupon transaction record 120 may be created having a smartcoupon token 123 in step 802. The issuing engine 191 may create multiple smartcoupon transaction records 120 with information provided by the issuer 101C through an input interface 404 of their client device 400. The issuer application 191 may initiates a request to create a block of smartcoupon transactions based on defined business rules and the quantity required. The request may be signed with the public key 124 of the issuer 101C. The smartcoupon token 123 may contain one or more data fields such as: issuer_ID 130; campaign_ID 131; offer name 132; max units issued 133; unit value 134; currency 135; issue date 136; expiry date 137; restrictions 138; rule type 139; product 140 (upc); min units purchased 141, min value purchased 142, max per user 143; geography restrictions 144; retailers restrictions 145; and other restrictions 146. The data in the fields of the smartcoupon token 123 may be or form the business rules of the smartcoupon 102 which must be satisfied in order for the smart coupon 102 to be redeemed and validated. For example, business rules of a smartcoupon token 123 may be: for use with product UPC 12345 67890; not to be used after expiry date of Jun. 30, 2016; and only to be used by retailer 101B Grocery Chain X.

In step 803 the smart coupon transaction record 120 may be provided to the blockchain database 109 by the issuing engine 191 preferably via the blockchain engine 192. The smart coupon transaction record 120 may be assigned to one of the blockchain nodes 112 and the request may be written to a backlog on the blockchain node 112. This backlog is designed to temporarily store and sequentially process the transactions.

In decision block 804 a determination of the validity of the smart coupon transaction record 120 may be made. The smart coupon transaction record 120 may be published to the blockchain and may be voted on by the other nodes 112 of the blockchain network 111 by the blockchain engine 192 preferably running on one or more nodes 112. The other nodes 112 vote on the transaction of the smart coupon transaction record 120 to determine if they agree the smart coupon transaction record 120 data creation transaction is valid. For example, if a majority (e.g. 2 of 3) of the nodes 112 agree the smart coupon transaction record 120 data creation transaction is valid, the smart coupon transaction record 120 may be determined to be valid. If only a minority (e.g. 1 of 3) vote for the smart coupon transaction record 120 data creation transaction, then the smart coupon transaction record 120 may be determined to be not valid. If the smart coupon transaction record 120 data creation transaction is determined to be valid, the method 800 may continue to step 805 and the smartcoupon transaction record 120 may be published to the blockchain database 109, in which the smartcoupon transaction record 120 includes an issuer public key 124 for the issuer 101C that published the smartcoupon transaction record 120, by blockchain engine 192 and copied to the other nodes 112 and the method 800 may finish 806. If the smart coupon transaction record 120 data creation transaction is determined to be not valid, the smart coupon transaction record 120 will not be published to the blockchain database 109 and the method 800 may finish 806.

Figure 9:
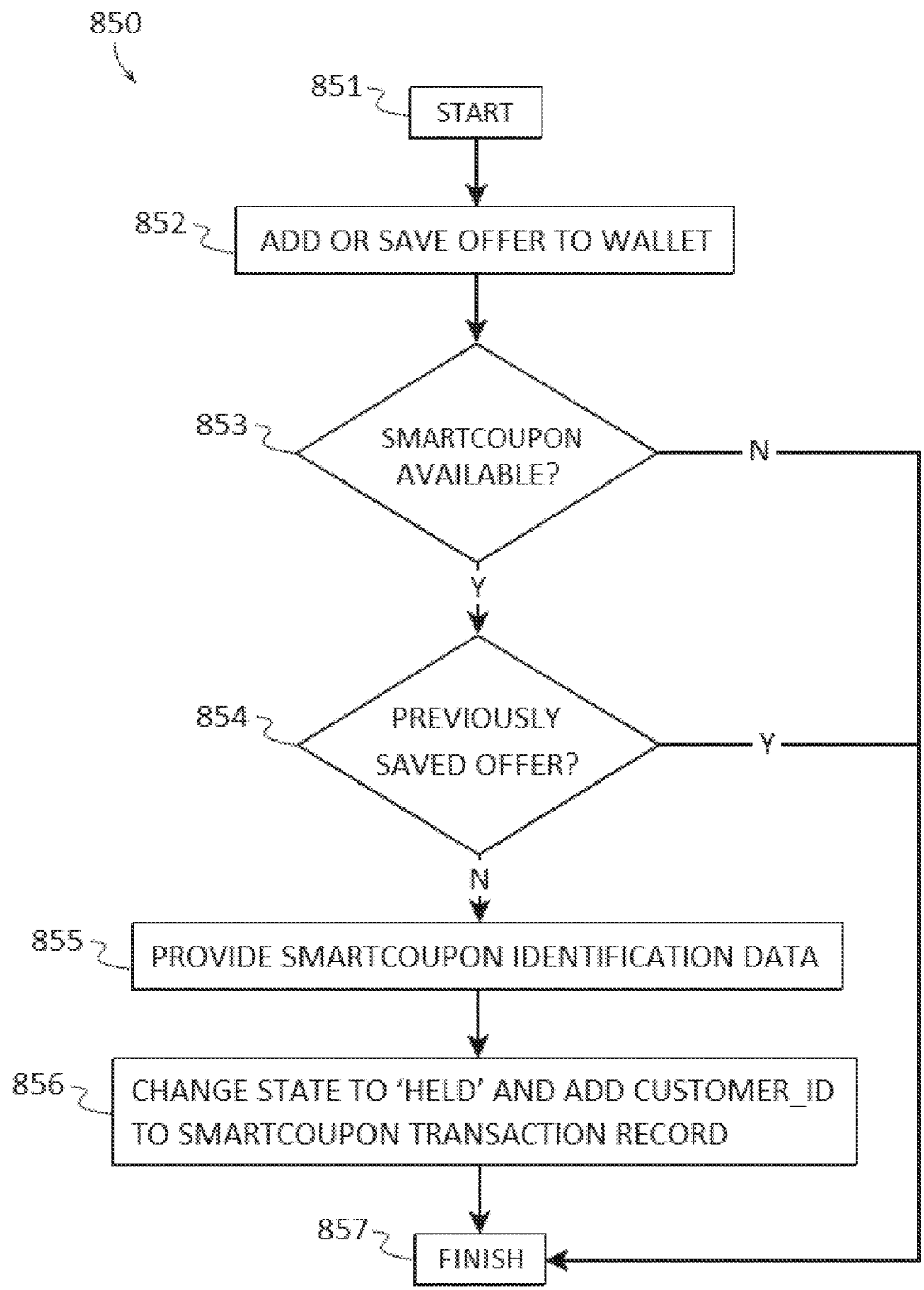
FIG. 9 shows a block diagram of a method for enabling a consumer to hold an offer on the blockchain until it is redeemed according to various embodiments described herein.

FIG. 9 shows an example of a computer implemented method for holding (aka reserving or saving) a smartcoupon for a specific consumer 101A when they add a smartcoupon 102 to a wallet 115, 116, ("the method") 850 according to various embodiments described herein. The method 850 is also designed to restrict the consumer 101A to only be able to save a single smartcoupon transaction for a given campaign 131. The Issuer 101C defines how they want to distribute the smartcoupon token online to consumers 101A. The consumer 101A discovers the offer and selects method of saving the smartcoupon(s) 102 to wallet in step 852, which can be a third party wallet 115 or a system wallet 116. The issuer engine 191 may first check to see if the smartcoupons are still available in decision block 853 and ensures they have not previously saved an offer in decision block 854. If they have not, then a unique smartcoupon ID 122 is issued step 855 by the issuing engine 191 and the status of the transaction record on the blockchain is changed to 'held' with the customer_ID 125 (consumer 101A identification data) being added to the smartcoupon transaction record 120 in step 856 and the smartcoupon 102 may only be redeemed by the consumer 101A having that matching customer_ID 125. After step 856, the method 850 may finish 857.

Figure 10:
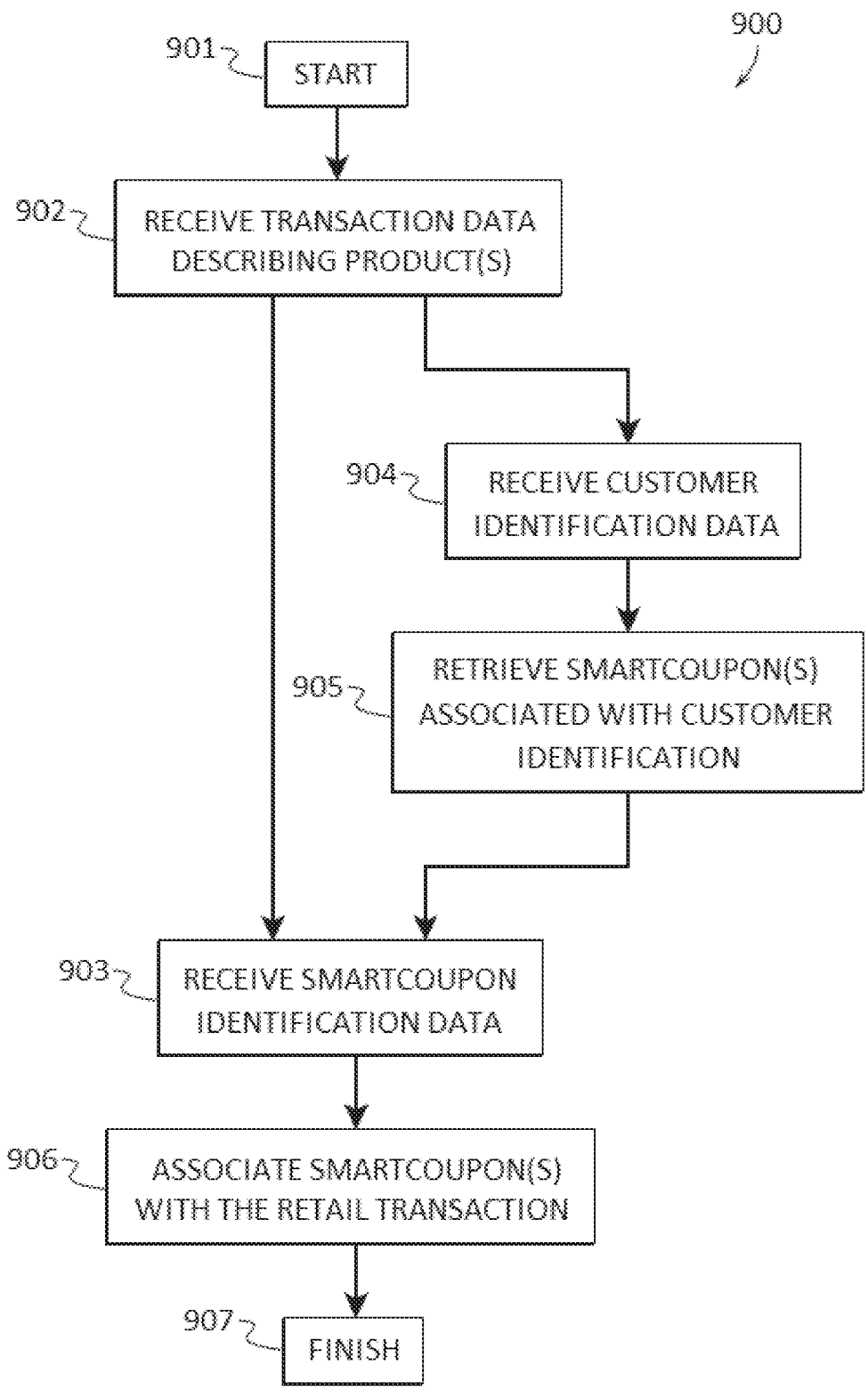
FIG. 10 shows a block diagram of an example of a computer implemented method for associating a smartcoupon with a retail transaction according to various embodiments described herein.

FIG. 10 shows an example of a computer implemented method for associating a smartcoupon with a retail transaction ("the method") 900 according to various embodiments described herein. The method 900 may be used by the system 100 to associate a smartcoupon 102 with a retail transaction between a consumer 101A and a retailer 101B. In some embodiments, the method 900 may start 901 and transaction data describing one or more products may be received in step 902. The transaction data describing one or more products may include the product identification code or UPC of the product(s). In some embodiments, the transaction data may be provided to the redemption engine 193 which may be running on a retailer POS terminal 400A via a I/O interfaces 404 of the retailer POS terminal 400A type of client device 400 such as a scanner or barcode reader, and/or a keypad or other manual data entry device.

In some embodiments, the method 900 may proceed from step 902 to step 904 and the redemption engine 193 use received customer identification data to receive or retrieve smartcoupon identification data that may be associated with the customer identification data from a system database 107 and/or a blockchain database 109. In further embodiments, the redemption engine 193 may receive the customer identification data, which may be a customer_ID 125, from the retailer POS terminal 400A from an input interface 404 of the retailer POS terminal and the issuing engine 191 may retrieve the smartcoupon identification data associated with the customer identification data from the system database 107 in step 905. In other embodiments, the redemption engine 193 may receive the customer identification data, which may be a customer_ID 125, from the retailer POS terminal 400A from an input interface 404 of the retailer POS terminal and the blockchain engine 192 may retrieve the smartcoupon identification data associated with the customer identification data from the blockchain database 109 in step 905. For example, one or more smartcoupons 102, such as by distributing the smartcoupon token 123 may be distributed to the client device 400 of the consumer 101A, the consumer 101A may select one or more smartcoupon 102, the smartcoupons 102 may be reserved for consumer 101A, such as in a wallet 115, 116, and the smartcoupon identification data may be associated with the customer identification data in a database 107, 109. The method 900 may then proceed from step 905 to step 903.

In step 903, smartcoupon identification data may be received. In some embodiments, the method 900 may proceed from step 905 to step 903, in which smartcoupon identification data may be received by the redemption engine 193 from the issuing engine 191 or blockchain engine 192. In other embodiments, the method 900 may proceed from step 902 to step 903, in which smartcoupon identification data may be received by the redemption engine 193 from the client device 400 of the consumer 101A, via an input interface 404 of the retailer POS terminal 400A so that the consumer 101A may use smartcoupons 102 without having to have an account or customer_ID 125 with the system 100. In some embodiments, the redemption engine 193 may receive the smartcoupon identification data, which may be the smartCoupon_ID 122, from the retailer POS terminal 400A from an input interface 404 of the retailer POS terminal. For example, the input interface 404 may comprise a scanner that may be used to read the smartCoupon_ID 122, barcode, or other smartcoupon identification data from the display screen 404A of the client device 400 of the consumer 101A. In another example, the input interface 404 may comprise a NFC radio that may be used to communicate with the NFC radio of the client device 400 of the consumer 101A to provide the smartCoupon_ID 122, barcode, or other smartcoupon identification data to the redemption engine 193.

In step 906, one or more smartcoupons 102 may be associated with the retail transaction by the redemption engine 193 and the method 900 may finish 907. By associating the one or more smartcoupons 102 with the retail transaction, the redemption engine 193 may store smartcoupons 102, and their associated smartcoupon tokens 123 in the memory 410 of the retailer POS terminal 400A in order to perform validation and redemption of any smartcoupons 102 having business rules in their smartcoupon tokens 123 that are satisfied with the transaction data received by the redemption engine 193.

Figure 11:
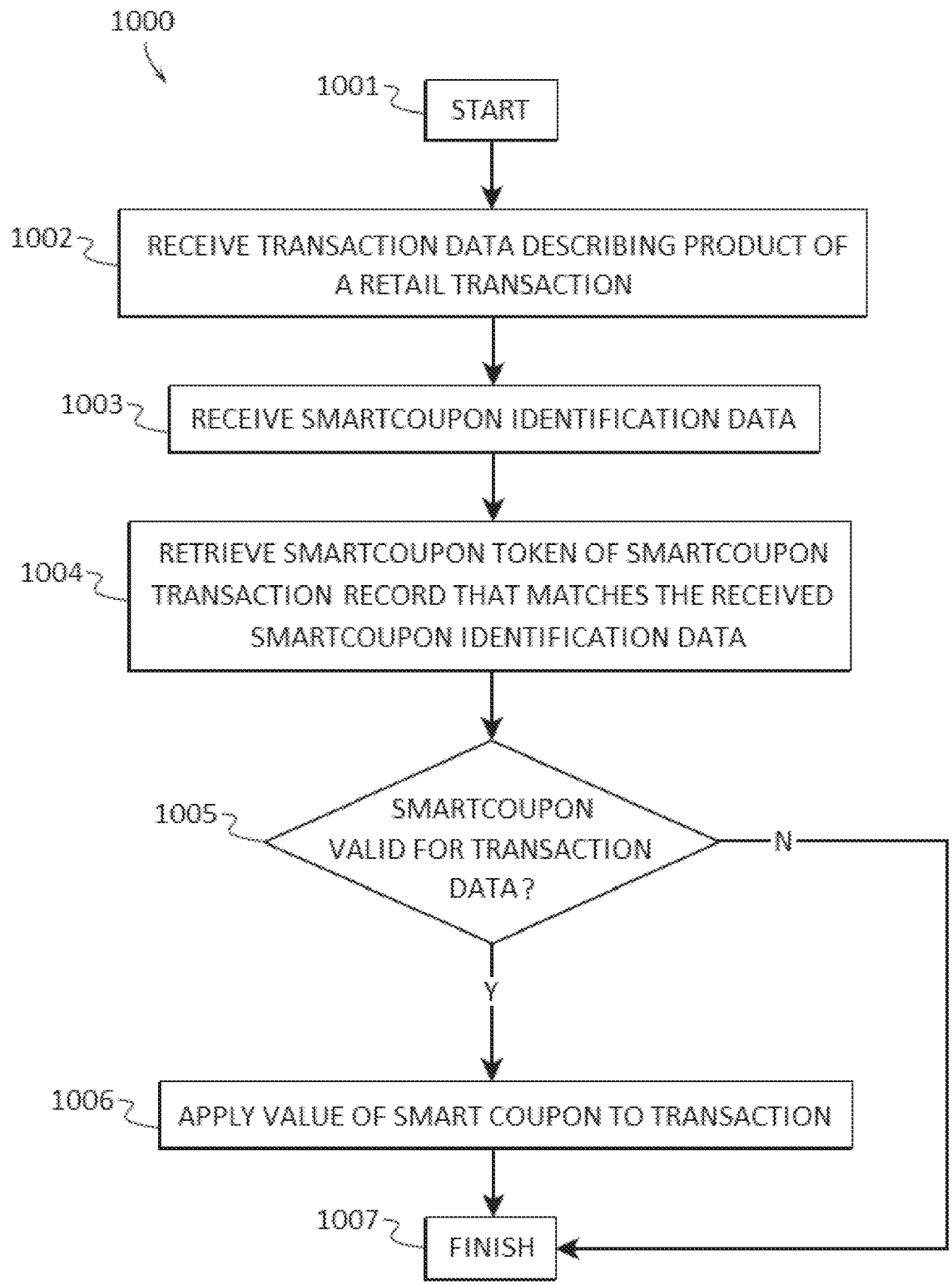
FIG. 11 depicts a block diagram of an example of a computer implemented method for validating a smartcoupon according to various embodiments described herein.

FIG. 11 depicts an example of a computer implemented method for validating a smartcoupon ("the method") 1000 according to various embodiments described herein. The method 1000 may be used by the system 100 to validate a smartcoupon 102 thereby determining if the smartcoupon 102 may be using in a retail transaction between a customer 101A and a retailer 101B. In some embodiments, the method 1000 may start 1001 and transaction data describing one or more products of a retail transaction may be received in step 1002. The transaction data describing one or more products may include the product identification code or UPC of the product(s). In some embodiments, the transaction data may be provided to the redemption engine 193 which may be running on a retailer POS terminal 400A via a I/O interfaces 404 of the retailer POS terminal 400A type of client device 400 such as a scanner or barcode reader, and/or a keypad or other manual data entry device.

In step 1003, smartcoupon identification data may be received. In some embodiments, smartcoupon identification data may be received by the redemption engine 193 from the issuing engine 191 or blockchain engine 192. In other embodiments, smartcoupon identification data may be received by the redemption engine 193 from the client device 400 of the consumer 101A, via an input interface 404 of the retailer POS terminal 400A so that the consumer 101A may use smartcoupons 102 without having to have an account or customer_ID 125 with the system 100. In some embodiments, the redemption engine 193 may receive the smartcoupon identification data, which may be the smartCoupon_ID 122, from the retailer POS terminal 400A from an input interface 404 of the retailer POS terminal.

In step 1004, the smartcoupon token 123 of the smartcoupon transaction record 120 that matches the received smartcoupon identification data may be retrieved from the blockchain database 109 by the blockchain engine 192 and provided to the redemption engine 193. If the status of the token equals "open" or "held" 128 then a smartcoupon token 123 for that transaction record is returned and includes the business rules formed by the data in the data fields of the smartcoupon token 123. For example, business rules of a smartcoupon token 123 may be a product 139 data field of: for use with product UPC 12345 67890; an expiry date 137 data field of: not to be used after expiry date of Jun. 30, 2016; and a retailers 142 data field of: only to be used by retailer 101B Grocery Chain X.

In decision block 1005 a determination if the smartcoupon 102 is valid for use with the transaction data may be made. The redemption engine 193 may compare the business rules of smartcoupon token 123 to the transaction information to determine if the business rules of the smartcoupon token 123 are satisfied by the data in the transaction information in order to determine if smartcoupon 102 is valid. In preferred embodiments, the transaction data describing the product includes a product identification code, and wherein the product identification code of the transaction data describing the product is required to match the product identification code of the product 139 data field from the retrieved smartcoupon token 132 in order for the smartcoupon 102 to be determined valid. Using the above example, if the transaction information includes a product UPC 12345 67890; a date on or before Jun. 30, 2016; and a retailers 142 data field of: only to be used by retailer 101B retailer UID 150 that matches Grocery Chain X, the redemption engine 193 determine that the smartcoupon 102 is valid since the business rules of the smartcoupon token 123 are satisfied by the data in the transaction information. If one or more business rules of the smartcoupon token 123 are not satisfied by the data in the transaction information, the redemption engine 193 determine that the smartcoupon 102 is not valid for use with the transaction described by the transaction information.

If the redemption engine 193 determines that the smartcoupon 102 is valid, the method 1000 may continue to step 1006 and the value of the smartcoupon 102, as described in the unit value 134 data field, may be applied to the transaction so that the value may be subtracted from the amount that the consumer 101A must pay the retailer 101B in order to receive the product(s) and the method 1000 may finish 1007. If the redemption engine 193 determines that the smartcoupon 102 is not valid, the value of the smartcoupon 102 may not be applied to the transaction and the method 1000 may finish 1007.

Figure 12:
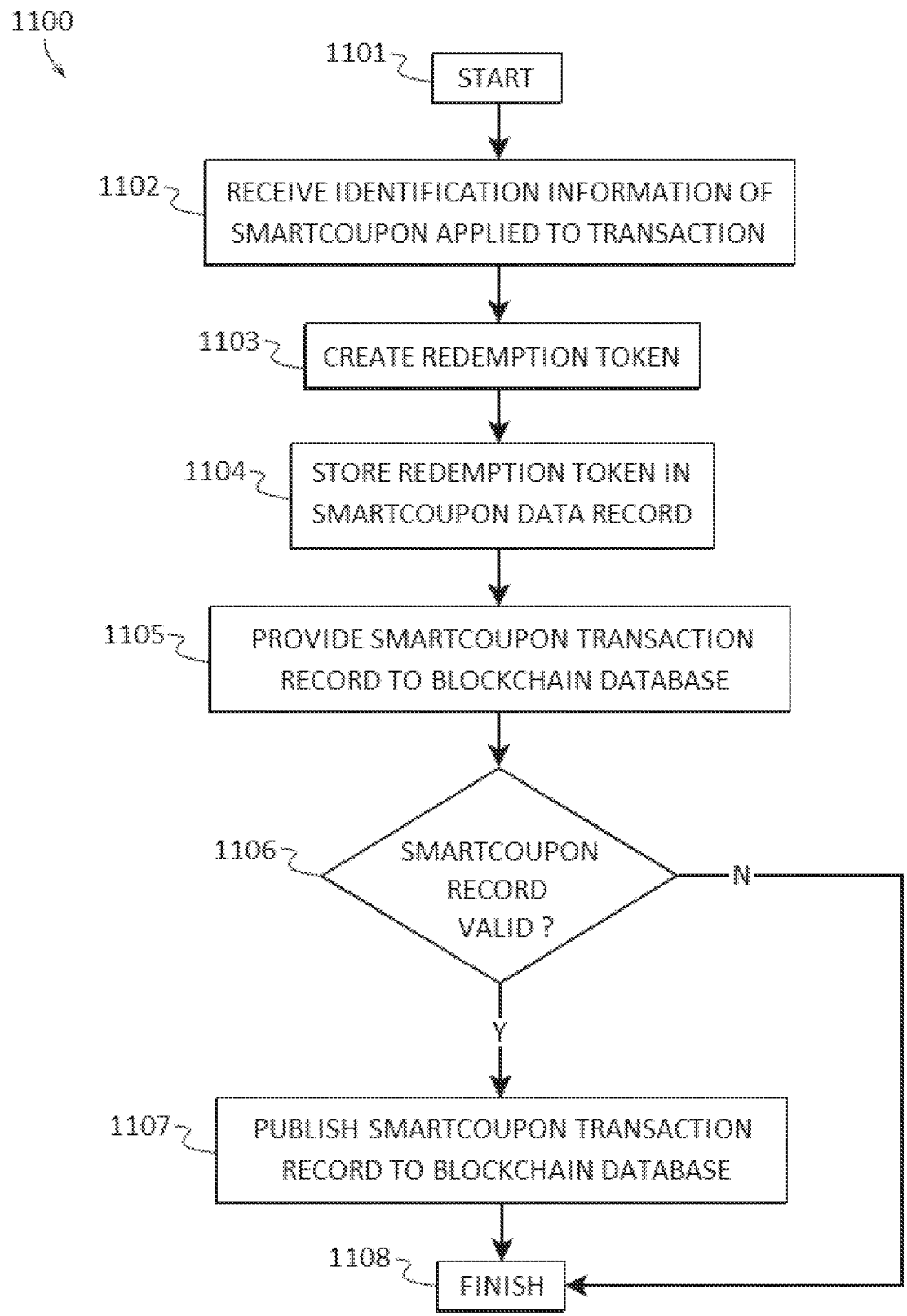
FIG. 12 illustrates a block diagram of an example of a computer implemented method for redeeming a smartcoupon according to various embodiments described herein.

FIG. 12 illustrates an example of a computer implemented method for redeeming a smartcoupon ("the method") 1100 according to various embodiments described herein. The method 1000 may be used by the system 100 to redeem a smartcoupon 102 thereby preventing the smartcoupon 102 from being used again and also to enable the retailer 101B to be compensated for accepting the smartcoupon 102 in a transaction. In some embodiments, the method 1100 may start 1101 and identification information (the smartCoupon_ID 122) of smartcoupon 102 which had its value applied to a transaction may be received by the redemption engine 193 in step 1102.

In step 1103, a redemption token 127 may be created by the redemption engine 193. In some embodiments, the redemption engine 193 may use the identification information (the smartCoupon_ID 122) of smartcoupon 102 and transaction information describing the retail transaction in which the smartcoupon was used to populate data fields, such as smartcoupon_ID 122; retailer UID 150; transaction_ID 121; product UPC 151; offer unit value 152; currency 135; and redemption time and date 153. Additionally, the redemption engine 193 may store the retailer public key 126 for the retailer 101B that created the redemption token 127 in the smart coupon transaction record 120 of the smartcoupon 102.

In step 1104, the redemption token 127 may be stored in smart coupon transaction record 120 by the redemption engine 193.

In step 1105, the smart coupon transaction record 120 comprising the redemption token 127 may be provided to the blockchain database 109 by the redemption engine 193, preferably via the blockchain engine 192. The smart coupon transaction record 120 may be assigned to one of the blockchain nodes 112 and the request may be written to a backlog on the blockchain node 112.

In decision block 1106 a determination of the validity of the smart coupon transaction record 120 may be made. The smart coupon transaction record 120 may be published to the blockchain and may be voted on by the other nodes 112 of the blockchain network 111 by the blockchain engine 192 preferably running on one or more nodes 112. The other nodes 112 vote on the transaction of the smart coupon transaction record 120 to determine if they agree the smart coupon transaction record 120 data creation transaction is valid. For example, if a majority (e.g. 2 of 3) of the nodes 112 agree the smart coupon transaction record 120 data creation transaction is valid, the smart coupon transaction record 120 may be determined to be valid. If only a minority (e.g. 1 of 3) vote for the smart coupon transaction record 120 data creation transaction, then the smart coupon transaction record 120 may be determined to be not valid. If the smart coupon transaction record 120 data creation transaction is determined to be valid, the method 1100 may continue to step 1107 and the smart coupon transaction record 120 may be published to the blockchain database 109 by blockchain engine 192 and copied to the other nodes 112 and the method 1100 may finish 1108. If the smart coupon transaction record 120 data creation transaction is determined to be not valid, the smart coupon transaction record 120 will not be published to the blockchain database 109 and the method 1100 may finish 1108.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An electronic coupon system method using a blockchain, the method comprising the steps of:
   creating a smartcoupon transaction record having data which includes a smartcoupon token, the smartcoupon transaction record comprising (i) a universal product identification code (UPC) associated with a product and (ii) a unit value associated with the product, the product having a price;
   providing the smartcoupon transaction record to a blockchain database;
   determining using more than one node of the blockchain if the smartcoupon transaction record is valid;
   publishing the smartcoupon transaction record to the blockchain database if the smartcoupon transaction record is valid, the smartcoupon transaction record including a first public key for an issuer that provided the smartcoupon transaction record;
   receiving transaction information related to the universal product identification code (UPC) through a retailer point-of-sale (POS) terminal, the retailer point-of-sale terminal comprising a processor, a memory in communication with the processor, a scanner in communication with the processor, and a NFC radio in communication with the processor;
   receiving smartcoupon identification data through one of (i) the scanner and (ii) the NFC radio of the retailer point-of-sale terminal;
   comparing the universal product identification code (UPC) or codes in the smartcoupon token to the universal product identification code (UPC) in the transaction information to determine if the smartcoupon token is valid;
   retrieving the smartcoupon token of the smartcoupon transaction record that matches the received smartcoupon identification data from the blockchain database;
   the processor of the retailer point-of-sale terminal subtracting the unit value from the price of the product;
   and wherein the first public key is generated for the issuer and a second public key is generated for a retailer, the first public key being different from the second public key and the blockchain database is updated to comprise both the first public key and the second public key.

2. The method of claim 1, wherein the smartcoupon token comprises a business rule and the smartcoupon comprising all of the following data fields: the unit value of the product, an expiry date, the universal product identification code (UPC) of the product, a geography, and one or more retailer_UIDs.

3. The method of claim 1, wherein a consumer identification value is associated with the smartcoupon identification data in the blockchain database, and wherein the smartcoupon identification data is received by the retailer point-of-sale terminal.

4. The method of claim 1, further comprising the steps of:
   creating a redemption token after receiving smartcoupon identification data from the retailer point-of-sale (POS) terminal;
   storing the redemption token in the smartcoupon transaction record;
   providing the smartcoupon transaction record to the blockchain database;
   determining using two or more nodes if the smartcoupon transaction record is valid; and
   publishing the smartcoupon transaction record to the blockchain database if the smartcoupon transaction record is valid.

* * * * *